United States Patent
Childress et al.

(10) Patent No.: US 11,048,444 B2
(45) Date of Patent: Jun. 29, 2021

(54) GROUPING DEVICES AS A VIRTUAL DEVICE FOR PROVIDING BETTER QUALITY OF DEVICE DATA

(71) Applicant: International Business Machines Corporation, Armonk, NY (US)

(72) Inventors: Rhonda L. Childress, Austin, TX (US); Rahul Gupta, Austin, TX (US); Timothy J. Hahn, Cary, NC (US); Leucir Marin, Jr., Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/691,357

(22) Filed: Nov. 21, 2019

(65) Prior Publication Data

US 2020/0089437 A1    Mar. 19, 2020

Related U.S. Application Data

(63) Continuation of application No. 15/633,495, filed on Jun. 26, 2017, now Pat. No. 10,528,293.

(51) Int. Cl.
| | |
|---|---|
| *G06F 3/06* | (2006.01) |
| *G06K 9/62* | (2006.01) |
| *H04L 29/06* | (2006.01) |
| *H04L 29/08* | (2006.01) |
| *G06K 9/00* | (2006.01) |

(52) U.S. Cl.
CPC .......... *G06F 3/0664* (2013.01); *G06F 3/0604* (2013.01); *G06F 3/0683* (2013.01); *G06K 9/00979* (2013.01); *G06K 9/6298* (2013.01)

(58) Field of Classification Search
USPC .............................. 711/6; 709/203, 223–229
See application file for complete search history.

(56) References Cited

U.S. PATENT DOCUMENTS

| | | | |
|---|---|---|---|
| 9,292,832 B2 | 3/2016 | Goel et al. | |
| 9,924,136 B1 | 3/2018 | Faulkner et al. | |
| 10,091,100 B1* | 10/2018 | Duerk | H04L 47/125 |
| 10,387,319 B2 | 8/2019 | Adler et al. | |
| 10,528,293 B2* | 1/2020 | Childress | G06F 3/0604 |

(Continued)

FOREIGN PATENT DOCUMENTS

WO    2014131038    8/2014

OTHER PUBLICATIONS

Bangerter, B., S. Talwar, R. Arefi, and K. Stewart, "Networks and Devices for the 5G Era", © 2014 IEEE, IEEE Communications Magazine 52.2, Feb. 2014, Total 7 pp.

(Continued)

*Primary Examiner* — Jude Jean Gilles
(74) *Attorney, Agent, or Firm* — Konrad Raynes Davda & Victor LLP; Janaki K. Davda (57) ABSTRACT

Provided are techniques for grouping devices as a virtual device for providing better quality of device data. A group of devices in an Internet of Things (IoT) network is identified based on one or more attributes of each of the devices. The group of devices is provided as a single virtual device by: collecting data from each of the devices in the group, transforming the data, and using the transformed data to modify a device.

20 Claims, 9 Drawing Sheets

(56) References Cited

U.S. PATENT DOCUMENTS

| | | | |
|---|---|---|---|
| 2011/0282989 A1* | 11/2011 | Geirhofer | H04W 8/005 709/224 |
| 2014/0005810 A1 | 1/2014 | Frei et al. | |
| 2014/0244017 A1 | 8/2014 | Freiwirth et al. | |
| 2015/0264138 A1* | 9/2015 | Watts, Jr. | H04L 67/1095 709/203 |
| 2015/0365480 A1 | 12/2015 | Soto et al. | |
| 2016/0043962 A1* | 2/2016 | Kim | H04W 4/08 709/224 |
| 2016/0044032 A1 | 2/2016 | Kim et al. | |
| 2016/0094485 A1 | 3/2016 | Choi et al. | |
| 2016/0232116 A1 | 8/2016 | Bone et al. | |
| 2016/0357521 A1 | 12/2016 | Zhang et al. | |
| 2016/0357522 A1 | 12/2016 | Wee et al. | |
| 2016/0357523 A1 | 12/2016 | Zhang et al. | |
| 2016/0357524 A1 | 12/2016 | Maluf et al. | |
| 2016/0357525 A1 | 12/2016 | Wee et al. | |
| 2016/0359664 A1 | 12/2016 | Malegaonkar et al. | |
| 2017/0005820 A1* | 1/2017 | Zimmerman | G05B 15/02 |
| 2017/0063826 A1 | 3/2017 | Sundaresan et al. | |
| 2017/0094706 A1* | 3/2017 | Kim | H04L 67/141 |
| 2017/0171607 A1* | 6/2017 | Britt | H04N 21/42202 |
| 2017/0351505 A1 | 12/2017 | Riedl | |
| 2018/0063289 A1* | 3/2018 | Loladia | H04L 63/0876 |
| 2018/0189063 A1 | 7/2018 | Fleming et al. | |
| 2018/0189231 A1 | 7/2018 | Fleming, Jr. et al. | |
| 2018/0285171 A1 | 10/2018 | Brady et al. | |
| 2018/0373462 A1 | 12/2018 | Childress et al. | |

OTHER PUBLICATIONS

Jung, M., J. Weidinger, C. Reinisch, W. Kastner, C. Crettaz, A. Olivieri, and Y. Bocchi, "A Transparent IPv6 Multi-protocol Gateway to Integrate Building Automation Systems in the Internet of Things", 2012 IEEE International Conference on Green Computing and Communications, Conference on Internet of Things, and Conference on Cyber, Physical and Social Computing, © 2012 IEEE. Retrieved from the Internet at <URL: 1https://datatracker.ietf.org/wg/core/charter/>, Accessed: May 15, 2012, Total 9 pp.

Jung, M., C. Reinisch, and W. Kastner, "Integrating Building Automation Systems and IPv6 in the Internet of Things", 2012 Sixth International Conference on Innovative Mobile and Internet Services in Ubiquitous Computing, © 2012 IEEE, Total 6 pp.

Mell, P. and T. Grange, "The NIST Definition of Cloud Computing (Draft)", Sep. 2011, Computer Security Division Information Technology Laboratory National Institute of Standards and Technology, Total 7 pp.

Mell, P. and T. Grance, "Effectively and Securely Using the Cloud Computing Paradigm", [online], Oct. 7, 2009 retrieved from the Internet at <URL: http://csrc.nist.gov/groups/SNS/cloud-computing/cloud-computing-v26.ppt>, Total 80 pp.

List of IBM Patents or Patent Applications Treated as Related, Nov. 21, 2019, 2 pp. [57.399C1 (Appendix P)].

Office Action 1 for U.S. Appl. No. 15/633,495, 14 pp., dated Mar. 28, 2019. [57.399 (OA1)].

Response to Office Action 1 for U.S. Appl. No. 15/633,495, 11 pp., dated Jun. 25, 2019. [57.399 (ROA1)].

Notice of Allowance 1 for U.S. Appl. No. 15/633,495, 8 pp., dated Aug. 27, 2019. [57.399 (NOA1)].

* cited by examiner

GROUPING DEVICES AS A VIRTUAL DEVICE FOR PROVIDING BETTER QUALITY OF DEVICE DATA

BACKGROUND

Embodiments of the invention relate to grouping devices as a virtual device for providing better quality of device data.

The Internet of Things (IoT) may be described as a group of devices that are connected to the Internet and communicate with each other and/or the rest of the internet. Each of the IoT devices typically has electronics and software to enable them to collect information and communicate that information with other IoT devices. For example, an IoT device may have a sensor to receive, as well as, track information.

However, if there are many IoT devices, then it may be overwhelming to have information come in from all of the IoT devices separately. There may be so much information that it is not easy to process or manage.

SUMMARY

Provided is a method for grouping devices as a virtual device for providing better quality of device data. The method comprises: identifying, using a processor of a computer, a group of devices in an Internet of Things (IoT) network based on one or more attributes of each of the devices; and providing the group of devices as a single virtual device by: collecting data from each of the devices in the group, transforming the data, and using the transformed data to modify a device.

Provided is a computer program product for grouping devices as a virtual device for providing better quality of device data. The computer program product comprises a computer readable storage medium having program code embodied therewith, the program code executable by at least one processor to perform operations of: identifying a group of devices in an Internet of Things (IoT) network based on one or more attributes of each of the devices; and providing the group of devices as a single virtual device by: collecting data from each of the devices in the group, transforming the data, and using the transformed data to modify a device.

Provided is a computer system for grouping devices as a virtual device for providing better quality of device data. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: identifying a group of devices in an Internet of Things (IoT) network based on one or more attributes of each of the devices; and providing the group of devices as a single virtual device by: collecting data from each of the devices in the group, transforming the data, and using the transformed data to modify a device.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
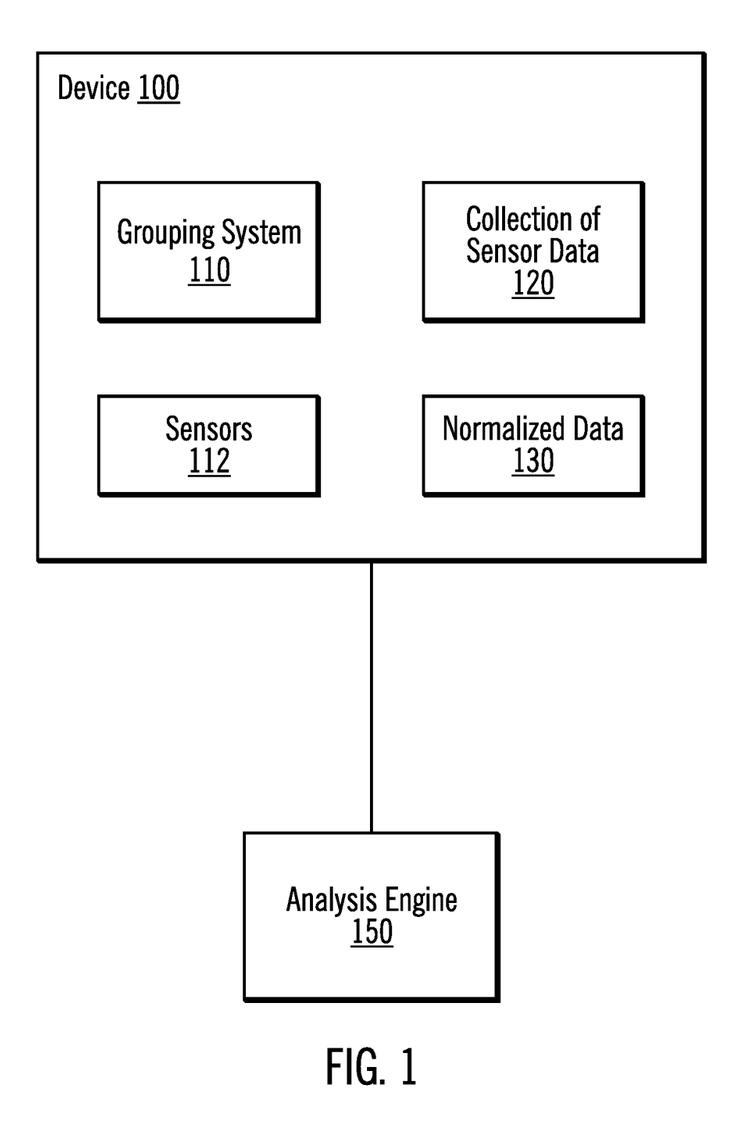
FIG. 1 illustrates, in a block diagram, a computing environment in accordance with certain embodiments.

FIG. 1 illustrates, in a block diagram, a computing environment in accordance with certain embodiments. A device 100 includes a grouping system 110, sensors 112, a collection of sensor data 120, and normalized data 130. The device 100 may be coupled to an analysis engine 150 that analyzes data from a group of devices, including device 100, which is a virtual device. With embodiments, the device 100 includes sensors 112 to receive and track information. The grouping system 110 receives information from the sensors 112. The collection of sensor data 120 may be from the sensors 112 and/or from sensors of other devices. With embodiments, the grouping system 112 may reside at a device within an Internet of Things, may be a computing device (e.g., a server) connected to the Internet of Things or may be a computing device in a cloud environment.

The grouping system 110 advantageously identifies groups of devices based on one or more common attributes, such as behavior, state, sensor reading and other attributes of a group. Attributes may also be referred to as characteristics or dimensions. Each of the groups represents a virtual device. With embodiments, the grouping system 110 normalizes the data sent from these sensors using various techniques to provide better quality of data. Thus, a group of devices is represented as a single device, referred to as a virtual device.

Figure 2:
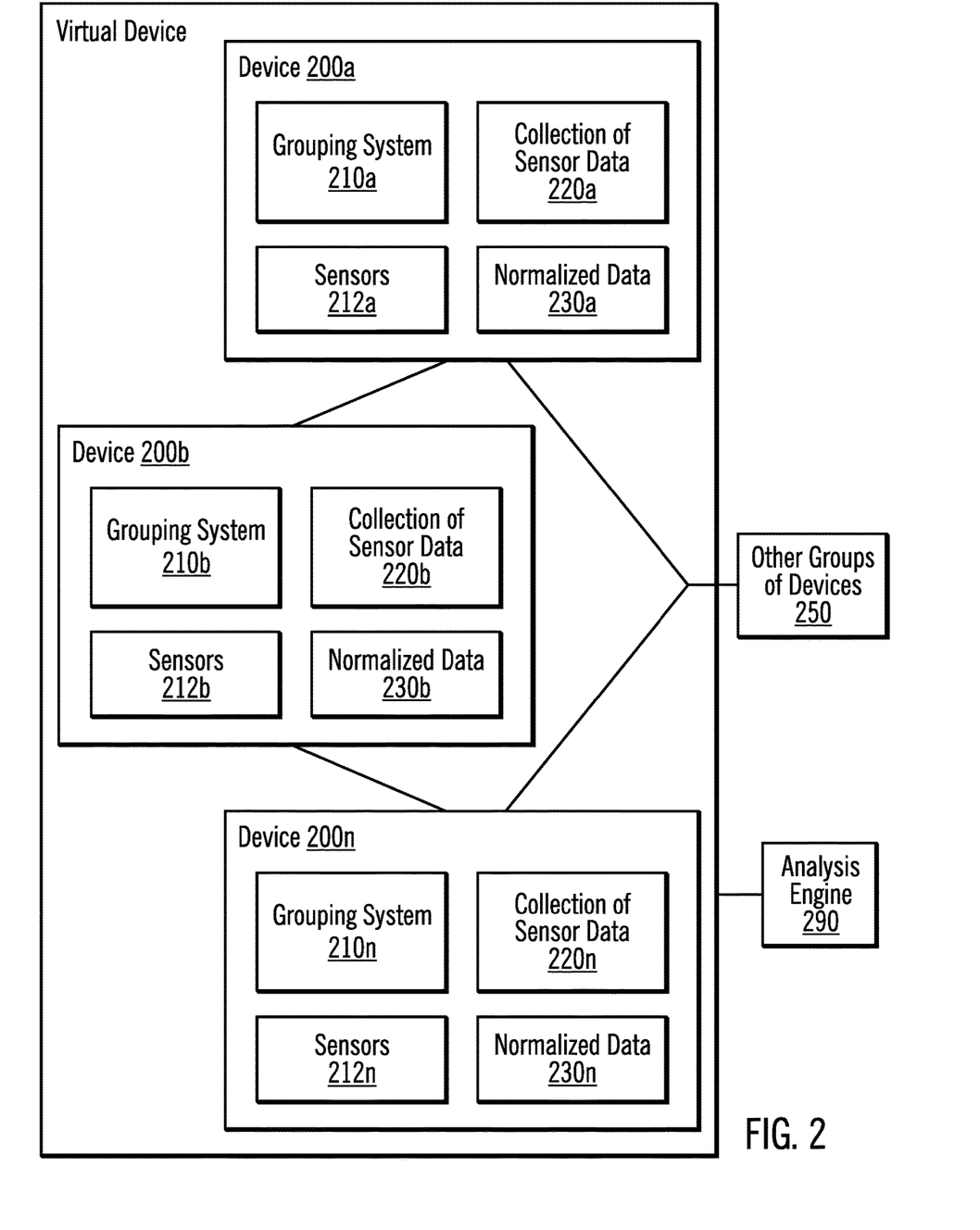
FIG. 2 illustrates a group of devices in accordance with certain embodiments.

FIG. 2 illustrates a group of devices in accordance with certain embodiments. The group of devices may form an IoT group. The devices may be IoT devices. The group of devices includes devices 200a, 200b . . . 200n. The group of devices 200a, 200b, . . . 200n is a virtual device and may be coupled to an analysis engine 290 that analyzes and uses data provided by the virtual device. Each device 200a, 200b . . . 200n in the group of devices is coupled to each of the other devices 200a, 200b . . . 200n via a network, such as the Internet, an intranet, etc. Moreover, the group of devices 200a, 200b . . . 200n may be coupled to other groups of devices 250. Each of the devices 200a, 200b . . . 200n includes a grouping system, sensors, a collection of sensor data, and normalized data. For example, device 200a includes a grouping system 210a, sensors 212a, a collection of sensor data 220a, and normalized data 230a; device 200b includes a grouping system 210b, sensors 212b, a collection of sensor data 220b, and normalized data 230b; and device 200n includes a grouping system 210n, sensors 212n, a collection of sensor data 220n, and normalized data 230n.

Figure 3:
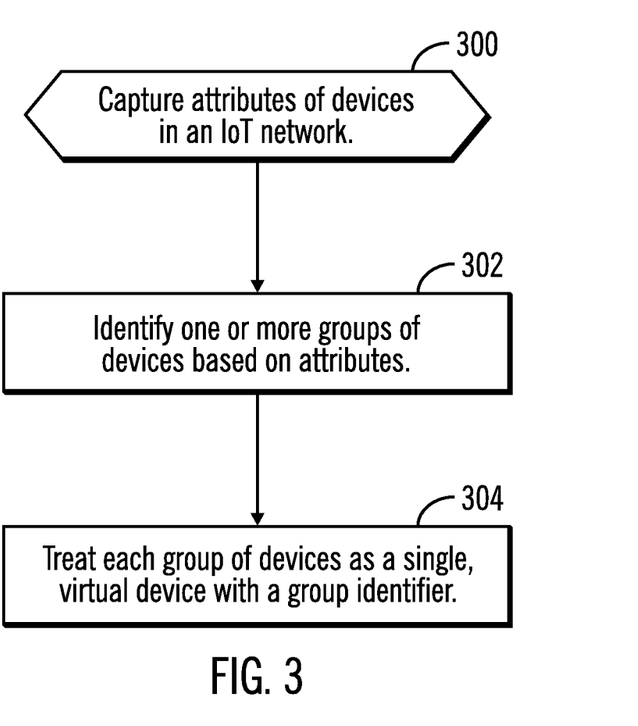
FIG. 3 illustrates, in a flow chart, operations for creating a virtual device in accordance with certain embodiments.

FIG. 3 illustrates, in a flow chart, operations for creating a virtual device in accordance with certain embodiments. Control begins at block 300 with the grouping system 110 capturing attributes of devices in an IoT network. The devices may be in different networks, may be in different groups already (e.g., due to being in different networks), etc. The attributes of a device include, for example, behavior, state, sensor reading, etc. With embodiments, behavior may be, for example, location of the device, whether the device is always on or not, whether the device wakes up periodically and on what schedule, whether the device is moving or not moving, etc. With embodiments, the state may be, for example, on/off, in-service vs. out-of-service, moving/not-moving, active vs. idle, being charged vs. running on battery power, etc. With embodiments, sensor readings include data from various sensors (e.g., temperature). The grouping system 110 may capture the attributes by one or more of: 1) based on documentation stored for the devices and public data for the devices and 2) analyzing data transmitted by the devices.

In certain embodiments, the grouping system 110 captures the attributes of the devices based on documentation stored for the devices and public data for the devices. With embodiments, the captured attributes include, for example, addressability (what address/name to use to contact the device), location, communication techniques/protocols, etc.

In certain embodiments, the grouping system 110 captures the attributes of the devices by analyzing data transmitted by the devices. With embodiments, the captured attributes include, for example, location based on Global Positioning System (GPS) data, location using beacon signals, location when device passes through a known Radio-Frequency Identification (RFID) gate, temperature, humidity, movement, motion capture events, foot-fall counts (e.g., steps), other types of counts (e.g., traffic counts), etc.

In block 302, the grouping system 110 identifies one or more groups of devices based on attributes for each group. The grouping system 110 may identify each of the groups by one or more of: 1) a pre-determined number of common attributes, 2) device proximity, 3) a geo-fenced area, 4) device types, 5) device cluster analysis, 6) device ownership and organization, 7) common and uncommon attributes, and 8) membership of different groups representing different virtual devices, etc.

In certain embodiments, a group is formed if devices have a pre-determined number of attributes in common. With embodiments, the pre-determined number may be set by system administrators or other users. With embodiments, the pre-determined number may be different for different groups.

In certain embodiments, the grouping system 110 forms a virtual device using the device proximity techniques (i.e., physically close devices form a group). For example, two motion detectors placed near one another and pointed in the same direction may be considered to be a group, and the combined readings from both may be used to constitute a single motion detector reading (from the "grouped device").

In certain embodiments, the grouping system 110 forms a virtual device using the a geo-fenced area(i.e., grouping devices within a geographic region).

In certain embodiments, the grouping system 110 forms a virtual device using the device types. With embodiments, the device types include, for example, camera, motion detector, temperature sensor, weather unit (humidity, wind speed, light level, rain/not-rain, etc.), GPS sensor, etc.

In certain embodiments, the grouping system 110 forms a virtual device using device cluster analysis. With embodiments, the grouping system 110 uses statistical techniques to identify groups based on collected attributes. One such statistical technique is referred to as cluster analysis and may be used to group samples (in this case, it would be samples coming from a set of devices done during a "learning" mode). The results of the cluster analysis may suggest some number of groups and the devices to put into each of the groups. This may be used when processing/combining future data samples coming from those grouped devices.

In certain embodiments, the grouping system 110 forms a virtual device using the device ownership and organization. With embodiments, all devices owned by a city may form a group, all devices owned by a tenant of a building may form a group, all devices owned by a building owner may form a group, etc.

In certain embodiments, the grouping system 110 forms a virtual device using multiple attributes, and these may be common or uncommon attributes between the devices. With embodiments, common attributes are attributes that the devices have in common with one another, while uncommon attributes are attributes that are different between the devices (i.e., not in common with other devices).

In certain embodiments, the grouping system 110 forms a virtual device using devices that are members of different groups representing different virtual devices.

In block 304, the grouping system treats each group of devices as a single, virtual device with a group identifier. For example, if 5 groups of devices are identified, then these are treated as 5 virtual devices. A virtual device may communicate with any other device, including an IoT device or another virtual device. In certain embodiments, the virtual device has the attributes of each device in the group IoT devices, i.e. the union of sampled data across the group of devices. In certain embodiments, the virtual device has a subset of the attributes of each device in the group of devices, i.e. some subset of the union of attributes.

With embodiments, the attributes of the virtual device may enhance the capability of the virtual device when compared to the individual devices that did not have common attributes (e.g., a first weather sensor may provide pressure data, a second weather sensor may provide humidity data, and a third sensor may provide temperature data to the virtual device, which will emit the attributes and data for all the three weather sensors, each of which are devices).

In certain embodiments, one grouping system 110 performs the operations of FIG. 3 to identify the virtual devices.

Figure 4:
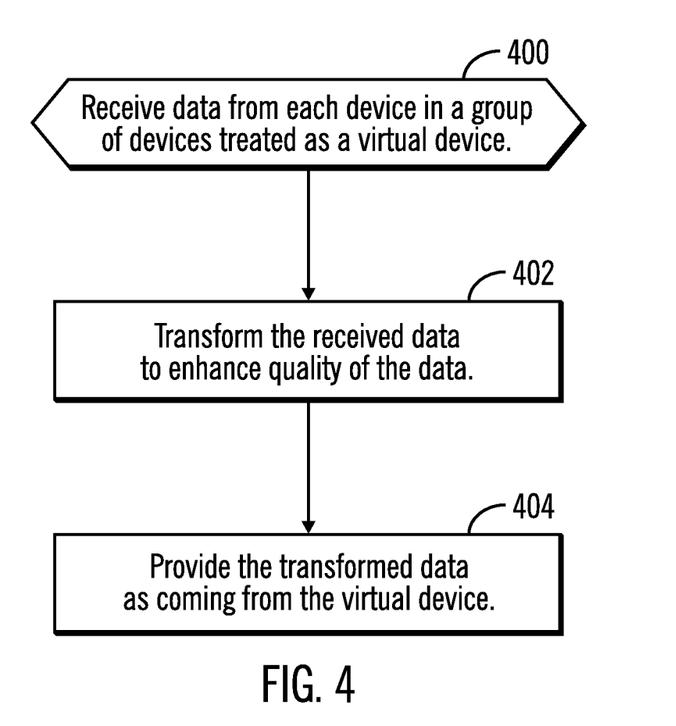
FIG. 4 illustrates, in a flow chart, operations for transforming data of a virtual device accordance with certain embodiments.

FIG. 4 illustrates, in a flow chart, operations for transforming data of a virtual device accordance with certain embodiments. Control begins at block 400 with the grouping system 110 receiving data from each device in a group of devices treated as a virtual device. In certain embodiments, the grouping system of one device in the group of devices is selected to collect and process data in accordance with the operations of FIG. 4.

In block 402, the grouping system 110 transforms the received data to enhance quality of the data. In certain embodiments, transforming the data includes one or more of: normalizing the data, averaging the data, combining the data, converging the data, etc. to enhance the quality of data. In certain embodiments, the grouping system 110 averages data from the devices in a group to represent the data from the virtual device. In certain embodiments, the grouping system 110 generates a weighted average of the data from the devices in a group to represent the data from the virtual device (e.g., if some devices in the group are known to be working better than others, then their data may be weighted differently). In certain embodiments, the grouping system 110 averages data from the devices reading values within 2-sigma (2 standard deviations) of the average of all values (while disregarding outliers) to represent the data from the virtual device. In certain embodiments, the grouping system 110 averages the data of the devices, while excluding high and low values, to represent the data from the virtual device. In certain embodiments, the grouping system 110 performs interpolation and/or extrapolation of sensor readings in the individual devices in order to calculate a combined device sensor reading for a time-stamp (point in time) that lies somewhere in between individual sensor reading samples or just beyond the last sensor reading sample from the individual devices.

With embodiments, there may be rules that indicate how to transform the data. For example, the rules may indicate whether to normalize the data, average the data, combine the data, converge the data, etc. and may indicate an order for performing these operations (e.g., first average the data, then normalize the data). The rules may be modified by system administrators or other users. The rules may be based on the type of data and conditions of the sensor readings coming from multiple devices.

For example, for temperature readings, if the sensor readings are very erratic, then a rule may indicate that the sensor readings are to be averaged. But, if the sensor readings are relatively consistent except for an outlier every 12 hours from one sensor, then a rule may indicate that the sensor readings are to be averaged after removal of any outliers.

With embodiments, once the data is transformed, the transformed data is used to determine whether to modify a device. In response to determining that the device is to be modified, that device is modified. In response to determining that the device is not to be modified, that device is not modified.

In block 404, the grouping system 110 provides (e.g., delivers) the transformed data as coming from the virtual device, having a group identifier, to an entity. With embodiments, the entity may be the grouping system 110 of one of the devices in the group or may be an analysis engine 150 coupled to the virtual device. For example, in certain embodiments, the entity may be the grouping system of the device in the group of devices that performed the operations of FIG. 4. Thus, the transformed data from the group of devices is advantageously provided as coming from one virtual device.

With embodiments, information from the virtual device may be used in many potential applications. One example may be that temperature readings are used to display a value in another location. As another example, the temperature value may be used to trigger processing in some other equipment. As a further example, the temperature value dropping below a certain level may trigger turning on a furnace nearby in order to heat up the area where the temperature reading was taken.

Merely to enhance understanding of embodiments, some examples are provided herein, but the embodiments are not to be limited to such examples.

In a first scenario, there may be multiple weather sensors of devices in a specific zip code, and each of these weather sensors may provide varied weather data. The devices may be grouped into virtual devices based on a geofence. Then, the quality of data sent from the weather sensors may be normalized to enhance the quality of the weather data.

In a second scenario, cars may be travelling on a multi-lane highway. Each of the cars may be considered an device that is transmitting an individual speed on the lane in which that car is travelling. The cars travelling between two points on the highway may act as single virtual car (i.e., a virtual device) and provide a normalized average speed between two points and travel times between two points.

With embodiments, the grouping system 110 finds devices with similar attributes and forms a group with these devices. Then, the grouping system 110 represents the group of devices as a single virtual device for enhancing the quality of data provided by the group of devices.

In certain embodiments, depending on the different attributes of the devices, the grouping system 110 may group the devices and represent them as a virtual device.

With embodiments a device may be in a first group devices based on a first set of attributes and in a second group of devices based on a second set of attributes.

With embodiments, in response to the one or more attributes of a device in the group of devices changing, a device may be removed from the group of devices.

Figure 5:
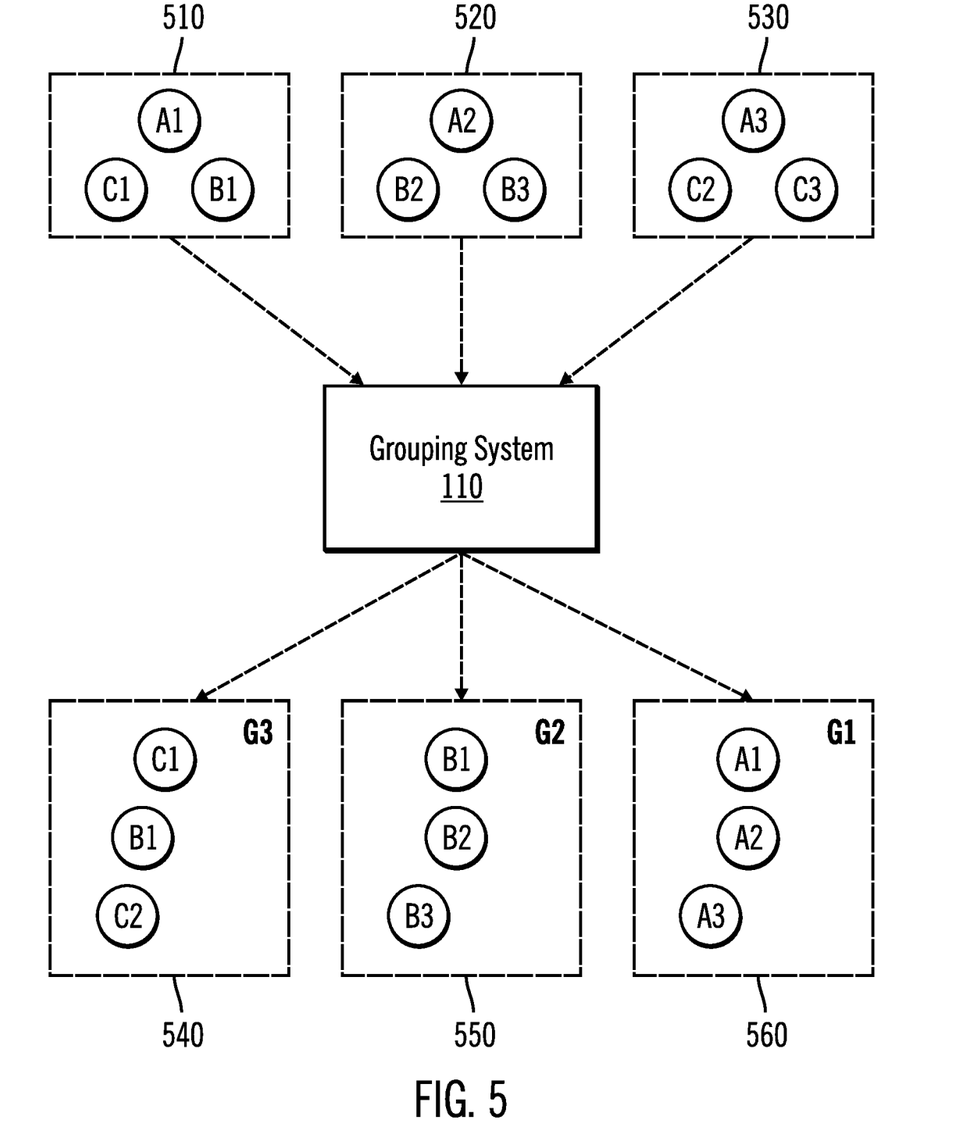
FIG. 5 illustrates grouping of devices in accordance with certain embodiments.

FIG. 5 illustrates grouping of devices in accordance with certain embodiments. In FIG. 5, the grouping system 110 collects attributes for devices in groups 510, 520, and 530. Groups 510, 520, and 530 may indicate original groupings for the devices. This may be based on some initial configuration that is set up during installation. Group 510 includes devices A1, B1, C1. Group 520 includes devices A2, B2, B3. Group 530 includes devices A3, C2, C3.

The grouping system 110 uses the attributes of the devices to create new groups 540, 550, 560 having group identifiers. The group identifier is used for the virtual device representing the group. Group 540 includes devices C1, B1, C2 with group identifier G3. Group 550 includes devices B1, B2, B3 with group identifier G2. Group 560 includes devices A1, A2, A3 with group identifier G1. Thus, based on grouping by attributes, device B1 is in two new groups (540, 550), while device C3 is not in any groups. Although for this example, the devices are shown in original groups 510, 520, and 530, with embodiments, the grouping system 110 may organize devices into groups that are not already in any groups. With embodiments, the devices A1, A2, A3 are represented by a virtual device having group identifier G1, instead of by individual device identifiers. Similarly, devices B1, B2, B3 are represented by a virtual device having group identifier G2, instead of by individual device identifiers. Also, devices B1, C1, C2 are represented by a virtual device having group identifier G3, instead of by individual device identifiers. Moreover, group G3 contains different devices (B1, C1, C2) that are grouped based on attributes. Thus, with embodiments, groups 540, 550, and 560 are virtual devices.

Figure 6:
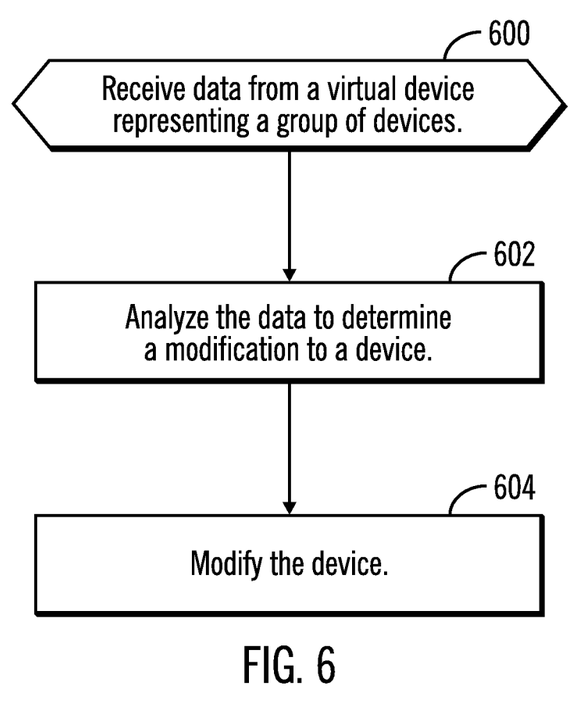
FIG. 6 illustrates, in a flow chart, operations for using transformed data accordance with certain embodiments.

FIG. 6 illustrates, in a flow chart, operations for using transformed data accordance with certain embodiments. Control begins at block 600 with an entity receiving data from a virtual device having a group identifier and representing a group of devices. In block 602, the entity analyzes the data to determine a modification to a device (e.g., one of the devices in the group of devices or a different device not in the group). In block 604, the entity modifies the device. With embodiments, the entity may be the grouping system 110 of one of the devices in the group or may be an analysis engine 150 coupled to the virtual device. For example, in certain embodiments, the entity may be the grouping system of the device in the group of devices that performed the operations of FIG. 4. Thus, the transformed data from the virtual device is advantageously used to modify a device. The modified device may be in the group of devices represented by the virtual device or may be a different device that is not in the group of devices represented by the virtual device.

Embodiments find similarities between devices in an IoT network to determine groupings of the devices. Embodiments create a virtual device based on data analysis of data output by a group of devices in the IoT network (e.g., by using analytics to identify and normalize data discrepancies and associate the data to the virtual device).

Embodiments enable managing a large amount of data from different devices (e.g., traffic lights in a portion of a city) by transforming the data from the different devices and presented it as coming from one virtual device.

Figure 7:
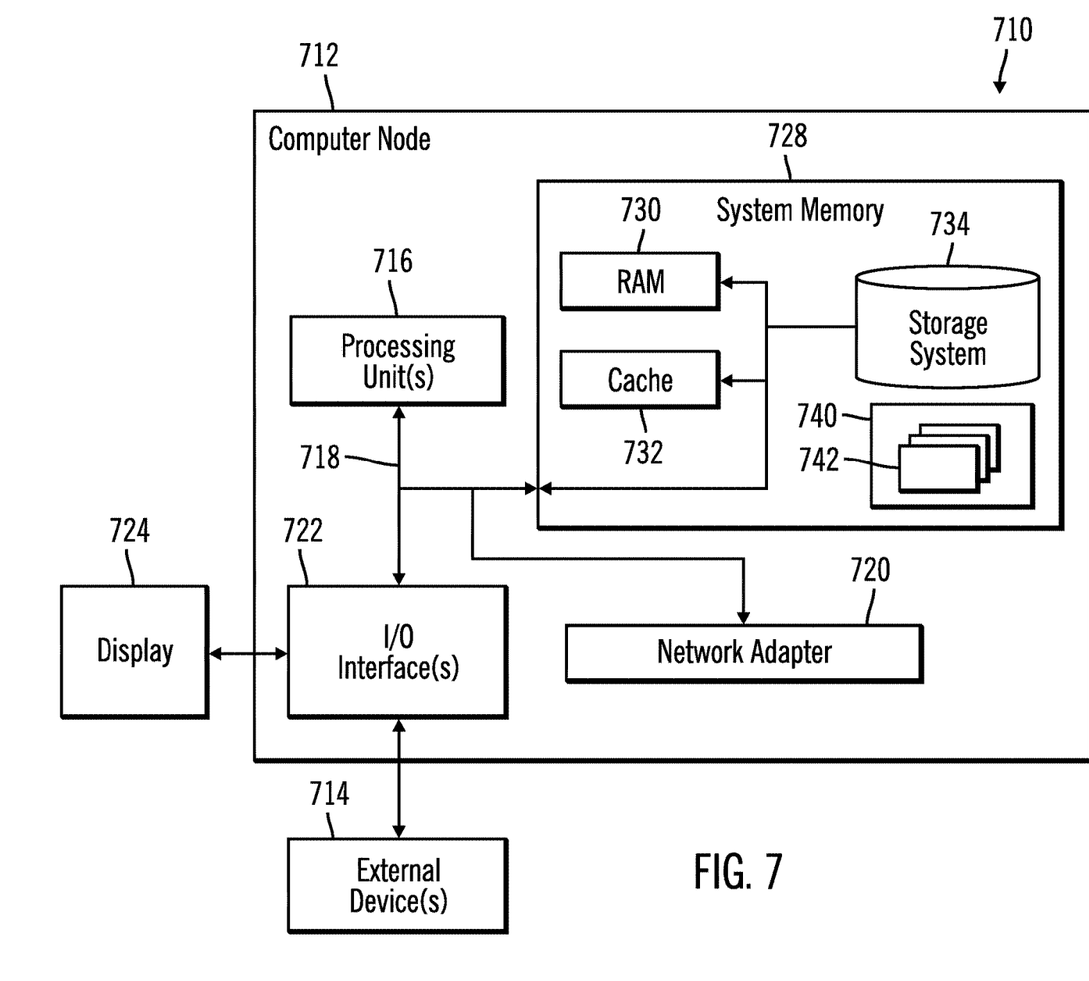
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 in cloud computing node 710 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the device 100 has the architecture of computer node 712. In certain embodiments, the device 100 is part of a cloud infrastructure. In certain alternative embodiments, the device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
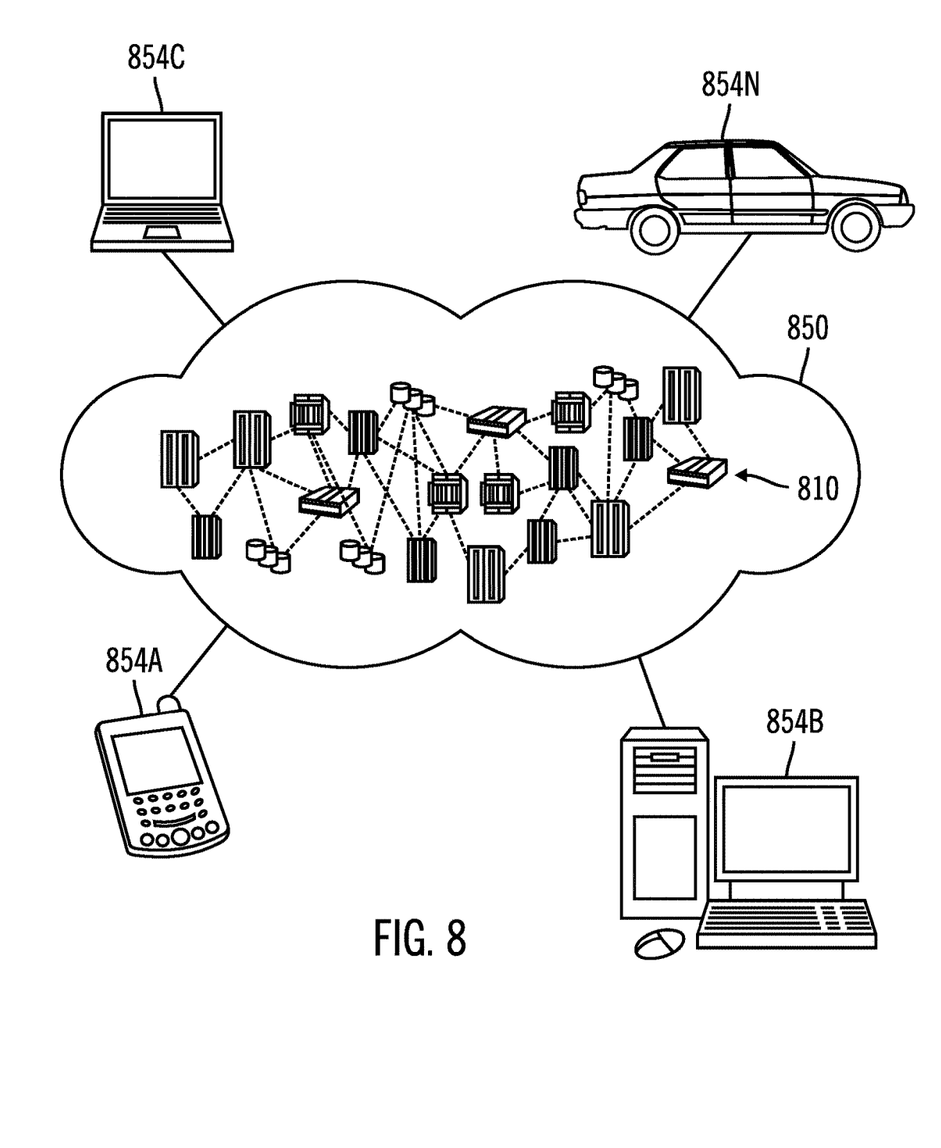
FIG. 8 illustrates a cloud computing environment according to an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
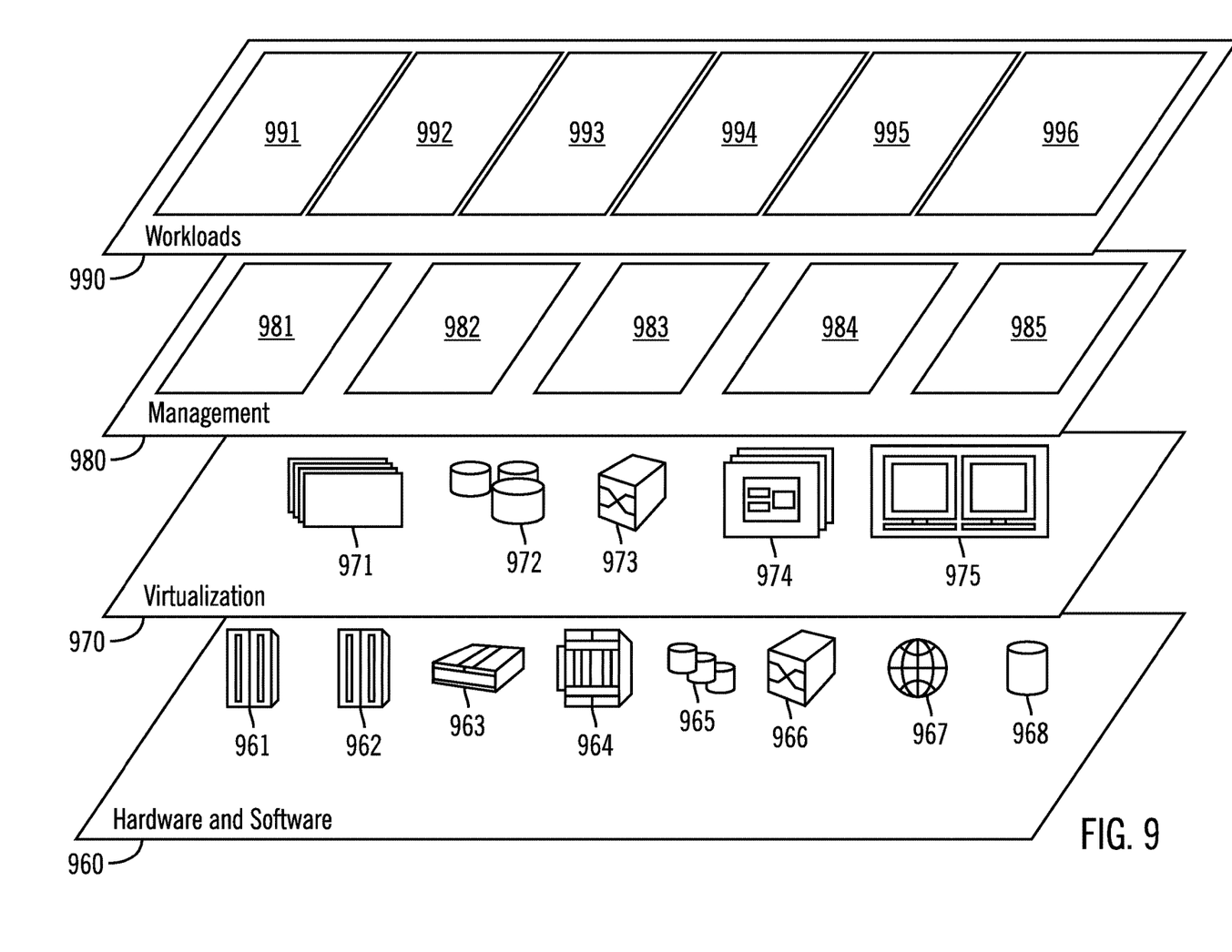
FIG. 9 illustrates abstraction model layers according to an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and grouping devices as a virtual device for providing better quality of device data 996.

Thus, in certain embodiments, software or a program, implementing grouping devices as a virtual device for providing better quality of device data in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    forming one or more groups of devices that each include a subset of devices in an Internet of Things (IoT) network based on one or more factors, wherein the factors comprise a pre-determined number of common attributes, device proximity, a geo-fenced area, device types, device cluster analysis, and membership of existing groups;
    providing each of the one or more groups of devices as a single virtual device by:
        collecting data from each of the devices in a group of devices;
        transforming the data using rules that perform transformation operations and that provide an order for the transformation operations; and
        providing the transformed data as coming from the single virtual device.

2. The computer-implemented method of claim 1, wherein each of the devices in the IoT network includes one or more sensors, a collection of sensor data, and normalized data.

3. The computer-implemented method of claim 1, further comprising operations for:
    capturing the one or more attributes of the devices in the IoT network based on documentation for the devices in the IoT network, based on public data for the devices in the IoT network, and by analyzing data transmitted by the devices in the IoT network and.

4. The computer-implemented method of claim 1, wherein the transformation operations comprise any combination of: normalizing the data, averaging the data, combining the data, and converging the data.

5. The computer-implemented method of claim 1, wherein a device of the devices in the IoT network is in a plurality of groups.

6. The computer-implemented method of claim 1, further comprising operations for:
    in response to the one or more attributes of a device in a group of devices of the one or more groups of devices changing, removing the device from the group of devices.

7. The computer-implemented method of claim 1, wherein a Software as a Service (SaaS) is configured to perform the operations of the method.

8. A computer program product, the computer program product comprising a computer readable storage medium having program code embodied therewith, the program code executable by at least one processor to perform operations for:
    forming one or more groups of devices that each include a subset of devices in an Internet of Things (IoT) network based on one or more factors, wherein the factors comprise a pre-determined number of common attributes, device proximity, a geo-fenced area, device types, device cluster analysis, and membership of existing groups;
    providing each of the one or more groups of devices as a single virtual device by:
        collecting data from each of the devices in a group of devices;
        transforming the data using rules that perform transformation operations and that provide an order for the transformation operations; and
        providing the transformed data as coming from the single virtual device.

9. The computer program product of claim 8, wherein each of the devices in the IoT network includes one or more sensors, a collection of sensor data, and normalized data.

10. The computer program product of claim 8, wherein the program code is executable by the at least one processor to perform operations for:
    capturing the one or more attributes of the devices in the IoT network based on documentation for the devices in the IoT network, based on public data for the devices in the IoT network, and by analyzing data transmitted by the devices in the IoT network and.

11. The computer program product of claim 8, wherein the transformation operations comprise any combination of: normalizing the data, averaging the data, combining the data, and converging the data.

12. The computer program product of claim 8, wherein a device of the devices in the IoT network is in a plurality of groups.

13. The computer program product of claim 8, wherein the program code is executable by the at least one processor to perform operations for:
    in response to the one or more attributes of a device in a group of devices of the one or more groups of devices changing, removing the device from the group of devices.

14. The computer program product of claim 8, wherein a Software as a Service (SaaS) is configured to perform the operations of the computer program product.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
forming one or more groups of devices that each include a subset of devices in an Internet of Things (IoT) network based on one or more factors, wherein the factors comprise a pre-determined number of common attributes, device proximity, a geo-fenced area, device types, device cluster analysis, and membership of existing groups;
providing each of the one or more groups of devices as a single virtual device by:
collecting data from each of the devices in a group of devices;
transforming the data using rules that perform transformation operations and that provide an order for the transformation operations; and
providing the transformed data as coming from the single virtual device.

16. The computer system of claim 15, wherein each of the devices in the IoT network includes one or more sensors, a collection of sensor data, and normalized data.

17. The computer system of claim 15, wherein the operations further comprise:
capturing the one or more attributes of the devices in the IoT network based on documentation for the devices in the IoT network, based on public data for the devices in the IoT network, and by analyzing data transmitted by the devices in the IoT network and.

18. The computer system of claim 15, wherein the transformation operations comprise any combination of: normalizing the data, averaging the data, combining the data, and converging the data.

19. The computer system of claim 15, wherein a device of the devices in the IoT network is in a plurality of groups.

20. The computer system of claim 15, wherein a Software as a Service (SaaS) is configured to perform the operations of the computer system.

* * * * *